US011236877B2

(12) United States Patent
Timinger

(10) Patent No.: US 11,236,877 B2
(45) Date of Patent: *Feb. 1, 2022

(54) AUTOMOTIVE LED LIGHTING MODULE

(71) Applicant: Lumileds LLC, San Jose, CA (US)

(72) Inventor: Andreas Timinger, Aachen (DE)

(73) Assignee: Lumileds LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/015,683

(22) Filed: Sep. 9, 2020

(65) Prior Publication Data

US 2021/0123576 A1    Apr. 29, 2021

Related U.S. Application Data

(63) Continuation of application No. 16/789,130, filed on Feb. 12, 2020, now Pat. No. 10,808,900.

(30) Foreign Application Priority Data

Oct. 25, 2019  (EP) ..................................... 19205248

(51) Int. Cl.
*F21S 41/141*  (2018.01)
*F21S 41/663*  (2018.01)
(Continued)

(52) U.S. Cl.
CPC ........... *F21S 41/141* (2018.01); *F21S 41/663* (2018.01); *H05B 45/10* (2020.01); *H05B 45/3725* (2020.01); *F21Y 2115/10* (2016.08)

(58) Field of Classification Search
CPC ...... F21S 41/141; F21S 41/663; H05B 45/10; H05B 45/3725; F21Y 2115/10
See application file for complete search history.

(56) References Cited

U.S. PATENT DOCUMENTS 10,808,900 B1    10/2020  Timinger
2018/0235046 A1*  8/2018  Muyshondt ............ H05B 45/38
2019/0063704 A1   2/2019  Diederich

FOREIGN PATENT DOCUMENTS

DE    102017130862 A1    6/2019
EP        3813487 A1    4/2021
(Continued)

OTHER PUBLICATIONS

"U.S. Appl. No. 16/789,130, 312 Preliminary Amendment filed Feb. 12, 2020", 7 pgs.
(Continued)

*Primary Examiner* — Mary Ellen Bowman
(74) *Attorney, Agent, or Firm* — Schwegman Lunberg & Woessner, P.A.

(57) ABSTRACT

Embodiments include an automotive LED lighting module comprising an LED lamp comprising a number of light-emitting diodes; a first driver module configured to drive the LED lamp at a first DC voltage level (U_hi); a second driver module configured to drive the LED lamp at a second DC voltage level (U_lo), which second DC voltage level (U_lo) is lower than the first DC voltage level (U_hi); and a switch arrangement comprising an interface for connection to a two-level DC voltage supply (PS), and wherein the switch arrangement is configured to connect the first driver module to the LED lamp when the input voltage is at a first level and to connect the second driver module to the LED lamp when the input voltage level is at a second level (U_lo). Embodiments can further include an automotive lighting system of a vehicle, and a method of operating an automotive LED lighting system.

20 Claims, 4 Drawing Sheets

(51) Int. Cl.
*H05B 45/10* (2020.01)
*H05B 45/3725* (2020.01)
*F21Y 115/10* (2016.01)

(56) References Cited

FOREIGN PATENT DOCUMENTS

| JP | 2018515895 | A | | 6/2018 | |
|----|------------|---|---|--------|---|
| KR | 20100084695 | A | | 7/2010 | |
| KR | 20160127804 | A | | 11/2016 | |
| KR | 20210050416 | A | | 5/2021 | |
| WO | WO-2016207013 | A1 | | 12/2016 | |
| WO | WO-2016207031 | A | * | 12/2016 | ........... B67C 3/2614 |

OTHER PUBLICATIONS

"U.S. Appl. No. 16/789,130, PTO Response to Rule 312 Communication dated Sep. 18, 2020", 2 pgs.
"European Application Serial No. 19205248.8, Office Action dated Apr. 2, 2020", 4 pgs.
"European Application Serial No. 19205248.8, Response filed Apr. 7, 2020 to Office Action dated Apr. 2, 2020", 17 pgs.
"U.S. Appl. No. 16/789,130, 312 Amendment filed Sep. 3, 2020", 6 pgs.
"U.S. Appl. No. 16/789,130, Notice of Allowance dated Jun. 5, 2020", 8 pgs.
"European Application Serial No. 19205248.8, European Search Report dated Jan. 14, 2020", 5 pgs.
"European Application Serial No. 19205248.8, Response filed Feb. 4, 2020 to Extended European Search Report dated Jan. 14, 2020", 7 pgs.
"Korean Application Serial No. 10-2020-0032472, Notice of Preliminary Rejection dated May 2, 2021", (w/ English Translation), 9 pgs.
"Korean Application Serial No. 10-2020-0032472, Response filed Jul. 8, 2021 to Notice of Preliminary Rejection dated May 2, 2021", w/ English Translation, 26 pgs.

* cited by examiner

AUTOMOTIVE LED LIGHTING MODULE

PRIORITY APPLICATION

This application is a continuation of and claims the benefit of priority to U.S. patent application Ser. No. 16/789,130, filed Feb. 12, 2020, which claims the benefit of priority to EP Patent Application Ser. No. 19205248.8, filed Oct. 25, 2019, each of which are incorporated herein by reference in their entireties.

FIELD OF THE DISCLOSURE

This disclosure describes an automotive LED lighting module; an automotive lighting system; and a method of operating an automotive LED lighting system.

BACKGROUND

Lighting units comprising light-emitting diodes (LEDs) are becoming more widespread in applications such as signalling lamps that are used in vehicles such as cars, motorcycles, buses etc. Such lamps must comply with strict regulations in order to obtain approval and certification. Standardized lamps that comply with a regulation such as the UN/ECE 8128 regulation may be referred to by function, for example an LW5 lamp is a white lamp suitable for use as a front headlamp for daytime running lights (DRL) function; an LY5 lamp is a yellow lamp suitable for used as a left/right signalling light, etc. These standardized automotive LED signalling lamps have built-in electronic drivers, and are designed to be connected to a specific "board voltage" to deliver the required luminous flux. The board voltage may be 12 V, for example. Automotive manufacturers may specify a board voltage range such 6-24 V to fulfil various requirements, for example an ECE regulation requires a testing voltage of 13.5 V for signalling lamps and a testing voltage of 12.3 V for lighting lamps.

Generally, automotive vehicles are required to provide multiple signalling lights. At a minimum, a vehicle usually must have front lights (high beam and low beam), front fog lights, tail-lights, brake lights, at least one reverse light, as well as front and rear indicator lights. In addition, a vehicle may be required to have front and rear position lights and/or side indicator lights and/or side position lights. A front position light can be on when the engine is stopped and the headlights are switched off. A front position light may also be on while driving. A rear position light may be referred to as a tail light. To realise two functions from the same location, for example side indicator lights and side position lights, a vehicle can be designed so that the lighting unit at the side is large enough to accommodate a side indicator light and a side position light.

For reasons of economy of space and to reduce costs, vehicle manufactures may prefer to design a vehicle so that a single lighting module fulfils more than one lighting function. To achieve this, for example to be able to use an LW5 lamp as a URL headlamp and also as a front position light, the lamp flux must be reduced to a fraction of its rated or nominal flux. However, the driver of a prior art automotive LED lighting module can only work with a single DC voltage level. Therefore, to "dim" a prior art LED lighting module, the DC signal pulse-width modulated, effectively converting the DC voltage into a pulse train with a duty cycle that results in the desired "dimming" level. However, this approach requires a dedicated PWM module between the DC supply and the LED lamp, thereby adding to the overall cost. Another disadvantage of this approach is that the driver of a standardized automotive LED lamp is generally not designed to run off a PWM signal, and the light output may exhibit flicker.

An embodiment provides an automotive LED lighting module that overcomes the problems described above.

SUMMARY

According to embodiments, the automotive LED lighting module comprises an LED lamp comprising a number of light-emitting diodes; a first driver module configured to drive the LED lamp at a first DC voltage level; a second driver module configured to drive the LED lamp at a second DC voltage level, which second DC voltage level is lower than the first DC voltage level; and a switch arrangement comprising an interface for connection to a two-level DC voltage supply, and wherein the switch arrangement is configured to connect the first driver module to the LED lamp when the input voltage is at a first level, and to connect the second driver module to the LED lamp when the input voltage level is at a second level.

In the context of embodiments, it may be assumed that the first DC voltage level is used to drive the LED lamp at its rated output flux, i.e. at 100% of rated flux. When driven at the second level, the output flux of the lamp will be less than the rated level. The LED lighting module therefore makes it possible to realise an internal dimming of the LED lamp, triggered by the lower DC voltage level.

An advantage of the automotive LED lighting module is that there is no need to provide a PWM capability to convert the first DC voltage level to a pulse-width modulated voltage. A more pertinent advantage is that both lamp driver modules only receive straight DC voltage levels, so that there is no risk of flicker in the light output that might otherwise arise from a pulse-width modulated voltage input.

In the context of the disclosure, the term "driver module" shall be understood to mean the arrangement of components that collectively act as a driver. A driver module may be realised as a separate entity, i.e. the first and second driver modules are realised as functionally separate blocks. Alternatively, the driver modules are not realised as separate physical entities, and instead share a number of components. For example, the driver modules may share a linear driver, the first driver module may comprise further circuitry to generate the higher current level, and the second driver module may comprise further circuitry to generate the lower current level.

According to embodiments, the automotive lighting system of a vehicle comprises a DC voltage supply configured to provide at least a first DC voltage level and a second DC voltage level; a number of such automotive LED lighting modules connected to the DC voltage supply; and a controller configured to control the DC voltage supply according to an operating state of the vehicle.

The DC voltage supply may comprise a car battery whose function it is to provide a DC voltage to any of several consumers or loads installed in the vehicle (electric door opener; air-conditioning, interior lighting, dashboard lighting, etc.) so that the battery can be regarded as a component in any of several independent consumer circuits.

According to embodiments, the method of operating such an automotive LED lighting system method comprises the steps of determining an operating state of the vehicle; and controlling the DC voltage supply to provide the first DC voltage level to a specific automotive LED lighting module during a first operating state or controlling the DC voltage supply to provide the second DC voltage level to that automotive LED lighting module during a second operating state.

The method can allow for an easy and straightforward reaction to a change in operating states. For example, a vehicle may be equipped with a pair of such automotive LED lighting modules at the front of the vehicle to act as daytime running lights and front position lights. When the driver of the vehicle halts the vehicle and selects the "park light" option from the dashboard, the DC voltage supply provides the second DC voltage level to the front lighting units, which then drive the LED lamps at a low light output level. This switchover from the "full" light output (while driving) to the "dimmed" light output (while parked) is effected without the need for any PWM modules. Similarly, a vehicle may be equipped with a pair of such automotive LED lighting modules at the rear of the vehicle to act as stop lights and tail-lights (rear position lights). The tail-lights are driven by the lower or second DC voltage level. When the driver of the vehicle presses the brake pedal, the DC voltage supply provides the first or higher DC voltage level. Here also, this switchover from the "low" light output (while cruising) to the "high" light output (while braking) is effected without the need for any PWM modules.

The dependent claims and the following description disclose particularly advantageous embodiments and features of the embodiments. Features of the embodiments may be combined as appropriate. Features described in the context of one claim category can apply equally to another claim category.

In the following, without restricting the embodiments in any way, it may be assumed that the DC voltage supply originates from a car battery, and that the first DC voltage level is within a range of 6-24 V, and the second DC voltage level is less than 6 V in order to accommodate for the possibility of voltage transients that may be as low as 6 V. The second DC voltage level can be at most 5 V in some embodiments.

The first driver module can be configured to drive the LED lamp at its rated output flux, and the second driver module is configured to drive the LED lamp at a fraction of its rated output flux, preferably at most 10% of its rated output flux.

In a particular embodiment, the switch arrangement, the first driver module and the second driver module are incorporated in a housing of the automotive LED lighting module, so that the LED lighting module can be provided as a stand-alone lighting unit that can provide two distinct light output levels. The interface for connection to the two-level voltage supply comprises a single positive terminal and a ground terminal realised as the two contact pins of the LED lamp.

In one embodiment, the LED lamp comprises a number of red light-emitting diodes to provide a tail light function when the input voltage is at the first level and to provide a rear position light function when the input voltage level is at the second level. In another embodiment, the LED lamp comprises a number of white-emitting LED light sources e.g., blue-emitting diodes with wavelength-converting phosphor) to provide a headlight function such as DRL when the input voltage is at the first level and to provide a front position light function when the input voltage level is at the second level. Alternatively, the LED lamp provides a front fog-light function when the input voltage is at the first level and a front position light function when the input voltage level is at the second level. In another embodiment, the LED lamp comprises a number of yellow light-emitting diodes to provide an indicator function when the input voltage is at the first level and to provide a side position light function when the input voltage level is at the second level.

For example, the LED lamp may be realized as a standard LW5 lamp for URL, outputting 350 lm (lumen) when driven by the first driver module. When driven by the second driver module, this same lamp may output only 35-70 lm (10%-20% of full light output), so that it can be used as a front position light. In another example, the LED lamp may be realized as a standard LY5 lamp for left/right turn signalling function, outputting 280 lm when driven by the first driver module. When driven by the second driver module, this same lamp may output only 28-56 lm, so that it can be used as a side position light. In another example, the LED lamp may be realized as a standard LR5 lamp for brake light function, outputting 120 lm when driven by the first driver module. When driven by the second driver module, this same lamp may output only 12-24 lm, so that it can be used as a rear tail-light.

In an embodiment, a vehicle comprises an automotive lighting system, in which the vehicle is equipped with a pair of automotive LED lighting modules comprising white-emitting LED light sources, configured to provide a front headlight function and a front position light function; and/or a pair of automotive LED lighting modules comprising red light-emitting diodes, configured to provide rear brake light function and rear tail-light function; and/or a pair of automotive LED lighting modules comprising yellow light-emitting diodes, configured to provide indicator light function and side position light function.

Alternatively or in addition, the vehicle can be equipped with a pair of automotive LED lighting modules comprising white-emitting LED light sources, configured to provide front fog-light function and front headlight function; and/or a pair of automotive LED lighting modules comprising red light-emitting diodes, configured to provide rear tail-light function and rear position light function.

Other aspects and features of embodiments will become apparent from the following detailed descriptions considered in conjunction with the accompanying drawings. It is to be understood, however, that the drawings are designed solely for the purposes of illustration and not as a definition of the limits of embodiments.

BRIEF DESCRIPTION OF THE DRAWINGS

In the drawings, like numbers refer to like components throughout. Components in the diagrams are not necessarily drawn to scale.

DETAILED DESCRIPTION OF THE EMBODIMENTS

Figure 1:
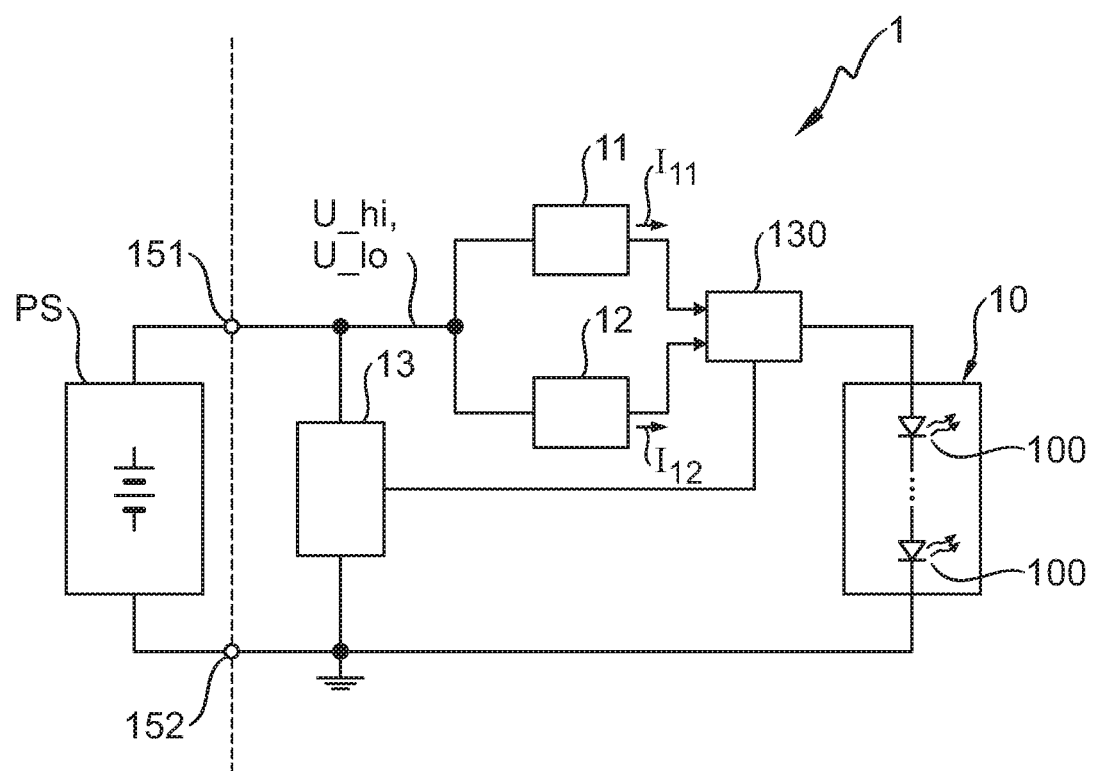
FIG. 1 is a schematic diagram of an embodiment of an automotive LED lighting module.

FIG. 1 is a schematic diagram of an embodiment of the automotive LED lighting module 1. The lighting module 1 comprises an LED lamp 10 with one or more light-emitting diodes 100, a first driver module 11 configured to drive the LED lamp 10 at a first DC voltage level $U\_hi$, and a second driver module 12 configured to drive the LED lamp 10 at a second DC voltage level U_lo, which can be at a level lower than any low transients that may appear on the first DC voltage level U_hi. The lighting module 1 further comprises a switch arrangement 13, 130 connected across an interface 151, 152. The interface can be in the form of a pair of input pins 151, 152 so that the LED lighting module 1 can be inserted into a suitable connector for connection to a DC voltage supply PS that delivers a voltage U_hi, U_lo according to a desired light output level. The switch arrangement 13, 130 is configured to connect the first driver module 11 to the LED lamp 10 when the input voltage is at a first level U_hi, and to connect the second driver module 12 to the LED lamp 10 when the voltage is at a second level U_lo. This could be done in any number of ways. For example, the switch arrangement may comprise a DC level sensing circuit 13 which controls a multiplexer 130 according to the voltage sensed across the inputs 151, 152. When the high voltage level U_hi is sensed, the switch arrangement 13, 130 routes the output of the "high-level" driver module 11 to the LED lamp 10; when the low voltage level U_lo is sensed, the switch arrangement 13, 130 routes the output of the "low-level" driver module 12 to the LED lamp 10. A driver module 11, 12 may be assumed to comprise a suitable driver architecture such as a resistor network, or a linear driver comprising active components, and a driver module 11, 12 is realised to limit the LED current $I_{11}$, $I_{12}$ to a defined level so that the LED lamp 10 is driven at a suitable constant current. The first driver module 11 will ensure that the LED lamp 10 is driven with a higher current $I_{11}$, while the second driver module 12 will ensure that the LED lamp 10 is driven with a lower current $I_{12}$. In the diagram, everything to the right of the interface 151, 152 may be realised inside a housing of the LED module 1. In the embodiment of FIG. 1 the driver modules 11, 12 are shown as functionally separate blocks, each with its own linear driver and control resistor, and the multiplexer 130 effectively connects the output of the desired driver module 11, 12 to the LED lamp 10.

Figure 2:
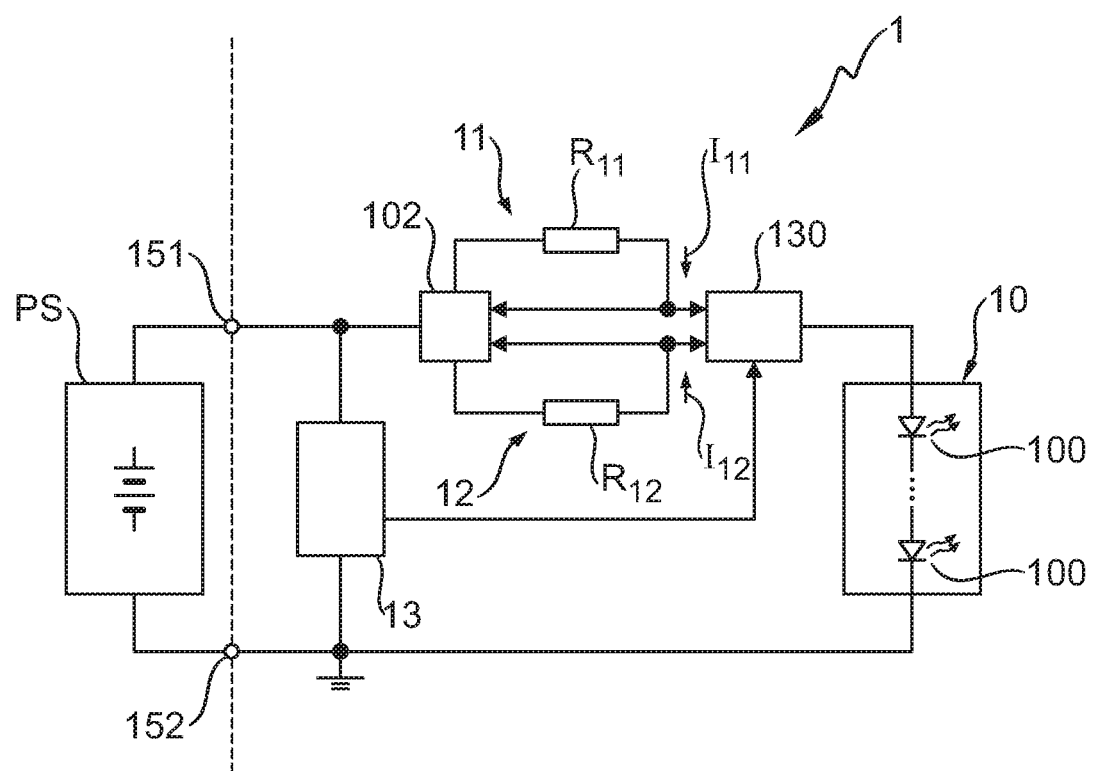
FIG. 2 is a schematic diagram of a further embodiment of an automotive LED lighting module.

FIG. 2 shows an alternative embodiment in which a single linear driver 102 may be used instead, with two distinct control resistors $R_{11}$, $R_{12}$ to determine the desired high and low current levels $I_{11}$, $I_{12}$. In this embodiment, the high-level driver module 11 comprises the linear driver 102 and the first resistor $R_{11}$, and the low-level driver module 12 comprises the linear driver 102 and the second resistor $R_{12}$. The driver modules 11, 12 effectively "share" the single linear driver 102. The multiplexer 130 is arranged to select the high current $I_{11}$ or the low current $I_{12}$ as desired.

Figure 3:
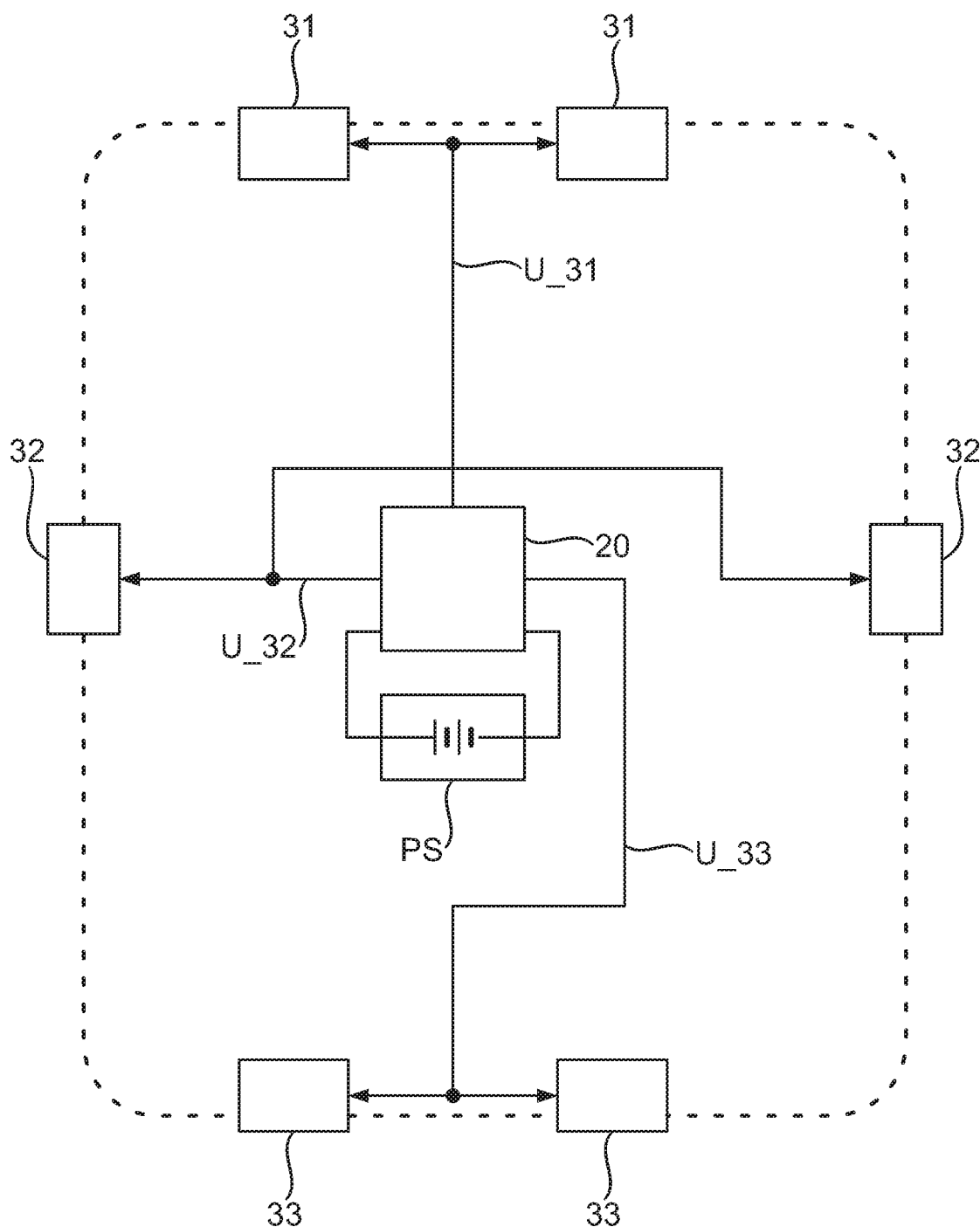
FIG. 3 is a schematic diagram of an embodiment of an automotive lighting system realised in an automobile.

FIG. 3 is a very simplified schematic diagram of an embodiment of the automotive lighting system 2 realised in an automobile 3 (indicated only very schematically be the dotted line). The automobile is equipped with several instances of the automotive LED lighting module 1, all of which are powered by a DC voltage supply PS. In this embodiment, instances of the automotive LED lighting module 1 are installed in front lighting units 31, rear lighting units 32, and side lighting units 33. The power supply PS provides power to a controller 20 or "body control unit" which provides each lighting unit 31, 32, 33 with the appropriate voltage for the applicable operating state of the automobile. For example, when the automobile 3 is being driven, the controller 20 ensures that the voltage U_31 provided to the LED lighting modules 1 of the front lighting units 31 is the high voltage level U_hi referred to in FIG. 1; the voltage U_33 provided to the LED lighting modules 1 of the rear lighting units 32 is the high voltage level U_hi referred to in FIG. 1; and the voltage U_33 provided to the LED lighting modules 1 of the side lighting units 33 is the low voltage level U_lo referred to in FIG. 1. When the automobile 3 is being turned left or right, the controller 20 ensures that the voltage U_33 provided to the LED lighting modules 1 of the side lighting units 33 alternates at a suitable rate between the high voltage level U_hi and the low voltage level U_lo; when the automobile is parked, the controller 20 ensures that the voltage provided to each lighting unit 31, 32, 33 is the low voltage level U_lo referred to in FIG. 1 to activate the position-light function in each case.

Figure 4:
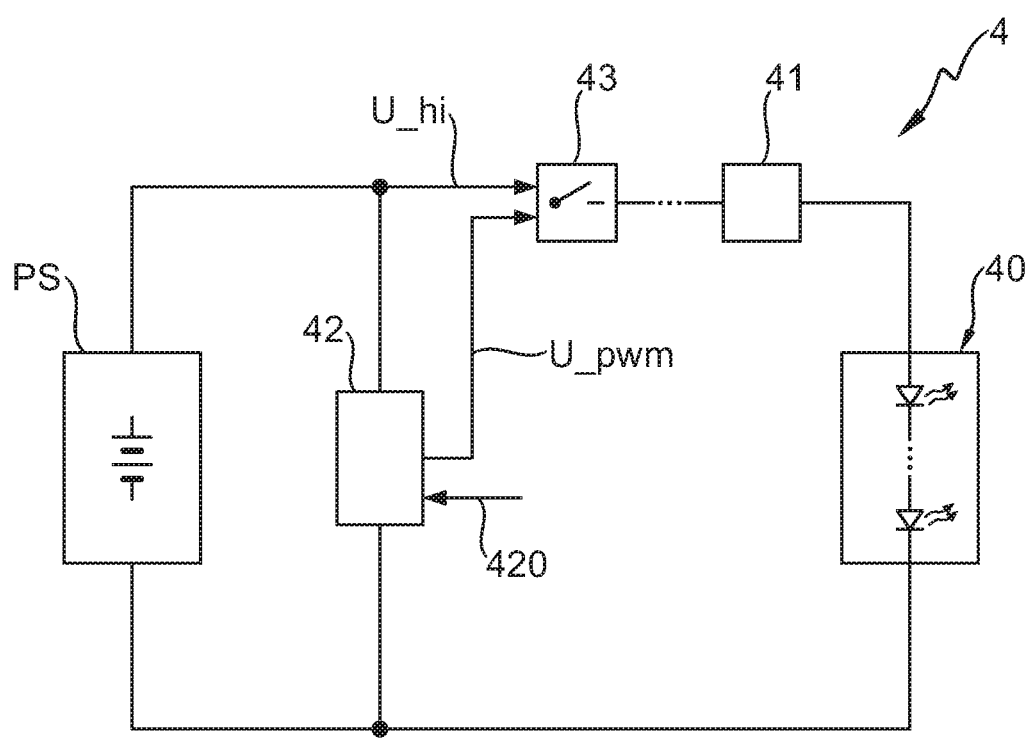
FIG. 4 shows a prior art automotive lighting system that uses a single LED lighting module to provide two functions.

FIG. 4 shows a prior art approach that uses a single LED lighting module 4 that uses a single LED lamp 40 to provide two functions, e.g. a LY5 lamp 40 that acts as indicator light when the vehicle is turning, as well as a side position light when the vehicle is not turning. To achieve this, the prior art approach requires a PWM module 42 that is actuated by a control signal 420 originating from a controller (not shown in the diagram) when the LED lamp 40 is to deliver less than its rated flux. By appropriate control of a switching module 43, the driver 40 of the LY5 lamp 40 is supplied with the usual voltage level U_hi to deliver 100% rated flux when the lamp 40 is to be used as an indicator light, or with the PWM modulated voltage U_pwm when the LED lamp 40 is to be used as a side position light.

Although embodiments have been disclosed in the form of embodiments and variations thereon, it will be understood that numerous additional modifications and variations could be made thereto without departing from the scope of embodiments. For example, although the automotive LED lighting module has been described to incorporate two driver modules and a switch module in the module housing, it is of course possible to realise the driver modules and switch module independently of an LED lamp. In such an embodiment, a single set of two driver modules and a switch module could be realised to drive a number of LED lamps, for example a number of LED lamps installed in spatially separate regions in a vehicle.

For the sake of clarity, it is to be understood that the use of "a" or "an" throughout this application does not exclude a plurality, and "comprising" does not exclude other steps or elements.

The invention claimed is:

1. A lighting module configured to drive a lighting element, the lighting module comprising:
   a first driver module configured to drive the lighting element at a first voltage level;
   a second driver module configured to drive the lighting element at a second voltage level, different than the first voltage level;
   a switch arrangement comprising an interface for connection to a voltage supply, the switch arrangement configured to connect the first driver module to the lighting element when an input voltage at the interface is at a first level, and to connect the second driver module to the lighting element when the input voltage at the interface is at a second level.

2. The lighting module to claim 1, wherein the interface for connection to the voltage supply comprises a single positive terminal and a ground terminal.

3. The lighting module of claim 1, wherein the switch arrangement, the first driver module and the second driver module are incorporated in the lighting element.

4. The lighting module of claim 1, wherein the first driver module is configured to drive the lighting element at a rated output flux of the lighting element.

5. The lighting module of claim 1, wherein the second driver module is configured to drive the lighting element at, at most, 10% of a rated output flux of the lighting element.

6. The lighting module of claim 1, wherein the lighting element comprises a number of red light-emitting light sources to provide a tail light function when the input voltage is at the first level and to provide a rear position light function when the input voltage is at the second level.

7. The lighting module of claim 1, wherein the lighting element comprises a number of white light-emitting light sources to provide a headlight function when the input voltage is at the first level and to provide a front position light function when the input voltage is at the second level.

8. The lighting module of claim 1, wherein the lighting element comprises a number of yellow light-emitting sources to provide an indicator function when the input voltage is at the first level and to provide a side position light function when the input voltage is at the second level.

9. A lighting system comprising:
a voltage supply configured to provide at least a first voltage level and a second voltage level, the second voltage level different than the first voltage level; and
a number of lighting modules, each lighting module including:
a lighting element comprising a number of light-emitting sources,
a first driver module configured to drive the lighting element at the first voltage level,
a second driver module configured to drive the lighting element at the second voltage level, and
a switch arrangement comprising an interface for connection to the voltage supply, the switch arrangement configured to connect the first driver module to the lighting element when an input voltage at the interface is at a first level, and to connect the second driver module to the lighting element when the input level at the interface is at a second level.

10. The lighting system of claim 9, wherein the first level is 13.5 Volts.

11. The lighting system of claim 9, wherein the second level is less than 6 Volts.

12. The lighting system of claim 9, wherein the lighting system is part of a vehicle, the vehicle comprising:
a front lighting unit with white-emitting light sources arranged to provide a front signalling function and a front position light function; or
a rear lighting unit with red-emitting light sources arranged to provide a rear signalling function and a rear position light function; or
a side lighting unit with yellow-emitting light sources arranged to provide an indicator light function and a side position light function.

13. A method of operating a lighting system of a device, the method comprising:
controlling a voltage supply to provide a first voltage level to a lighting module during a first operating state of the device, the lighting module including a lighting element comprising a number of lighting sources, a first driver module configured to drive the lighting element at a first voltage level, a second driver module configured to drive the lighting element at a second voltage level, the second voltage level different than the first voltage level, a switch arrangement comprising an interface for connection to the voltage supply, the switch arrangement configured to connect the first driver module to the lighting element when an input voltage at the interface is at a first level, and to connect the second driver module to the lighting element when the input voltage at the interface is at a second level; and
controlling the voltage supply to provide the second voltage level to the lighting module during a second operating state of the device.

14. The method of claim 13, further comprising connecting the lighting element to the voltage supply using a single positive terminal and a ground terminal.

15. A method of claim 13, further comprising incorporating the switch arrangement, the first driver module and the second driver module in the lighting element.

16. The method of claim 13, wherein the first driver module is configured to drive the lighting element at a rated output flux of the lighting element.

17. The method of claim 13, further comprising driving, by the second driver module, the lighting element at, at most, 10% of a rated output flux of the lighting element.

18. The method of claim 13, further comprising providing, by a number of red-emitting light sources of the lighting element, a tail light function when the input voltage is at the first level and to a rear position light function when the input voltage is at the second level.

19. The method of claim 13, further comprising providing, by a number of white-emitting light sources of the lighting element, a headlight function when the input voltage is at the first level and a front position light function when the input voltage is at the second level.

20. The method of claim 13, further comprising providing, by a number of yellow-emitting light sources, an indicator function when the input voltage is at the first level and to a side position light function when the input voltage is at the second level.

* * * * *

UNITED STATES PATENT AND TRADEMARK OFFICE
CERTIFICATE OF CORRECTION

| | | |
|---|---|---|
| PATENT NO. | : 11,236,877 B2 | Page 1 of 1 |
| APPLICATION NO. | : 17/015683 | |
| DATED | : February 1, 2022 | |
| INVENTOR(S) | : Andreas Timinger | |

It is certified that error appears in the above-identified patent and that said Letters Patent is hereby corrected as shown below:

On the Title Page

In item (57), in "Abstract", in Column 2, Line 11, after "level", insert --($U\_hi$),--

Signed and Sealed this
Fifteenth Day of November, 2022

*Katherine Kelly Vidal*
*Director of the United States Patent and Trademark Office*